(12) United States Patent
Shibata

(10) Patent No.: US 9,319,588 B2
(45) Date of Patent: Apr. 19, 2016

(54) IMAGE CAPTURING APPARATUS CAPABLE OF IMAGE STABILIZATION DURING A PANNING OPERATION AND METHOD OF CONTROLLING THE SAME

(71) Applicant: CANON KABUSHIKI KAISHA, Tokyo (JP)

(72) Inventor: Masahiro Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/258,748

(22) Filed: Apr. 22, 2014

(65) Prior Publication Data

US 2014/0320680 A1 Oct. 30, 2014

(30) Foreign Application Priority Data

Apr. 25, 2013 (JP) .................................. 2013-093044

(51) Int. Cl.
*H04N 5/225* (2006.01)
*H04N 5/232* (2006.01)

(52) U.S. Cl.
CPC ....... *H04N 5/23261* (2013.01); *H04N 5/23258* (2013.01); *H04N 5/23287* (2013.01)

(58) Field of Classification Search
CPC ................................................ H04N 5/23261
USPC ....................................................... 348/208.3
See application file for complete search history.

(56) References Cited

U.S. PATENT DOCUMENTS

| | | | |
|---|---|---|---|
| 5,761,545 A * | 6/1998 | Tanaka et al. | 396/53 |
| 5,862,415 A * | 1/1999 | Matsumoto | 396/55 |
| 2006/0082656 A1* | 4/2006 | Ochiai | 348/207.99 |
| 2011/0158620 A1* | 6/2011 | Kanayama et al. | 396/55 |
| 2011/0234822 A1* | 9/2011 | Miyasako | 348/208.1 |
| 2011/0279691 A1* | 11/2011 | Ishii et al. | 348/207.99 |

FOREIGN PATENT DOCUMENTS

JP 2006-115322 A 4/2006

OTHER PUBLICATIONS

British Search Report issued on Oct. 17, 2014, that issued in the corresponding British Patent Application No. 1407282.1.

* cited by examiner

*Primary Examiner* — Twyler Haskins
*Assistant Examiner* — Dwight C Tejano
(74) *Attorney, Agent, or Firm* — Cowan, Liebowitz & Latman, P.C.

(57) ABSTRACT

An image capturing apparatus comprises a shake detection unit configured to detect a shake, an image stabilization unit configured to correct the shake of an image, panning detection unit configured to detect based on a detection result of the shake detection unit whether a panning operation is being executed, a speed setting unit configured to set a target speed of the panning operation, a calculation unit configured to calculate a correction amount of the image stabilization unit based on the target speed set by the speed setting unit and a speed of the shake detected by the shake detection unit, and control unit configured to control a movement of the image stabilization unit based on the correction amount calculated by the calculation unit when the panning detection unit detects that the panning operation is being executed.

9 Claims, 5 Drawing Sheets

IMAGE CAPTURING APPARATUS CAPABLE OF IMAGE STABILIZATION DURING A PANNING OPERATION AND METHOD OF CONTROLLING THE SAME

BACKGROUND OF THE INVENTION

1. Field of the Invention

The present invention relates to a technique of implementing smooth panning close to a predetermined speed by performing image stabilization considering a panning (the movement or rotation in a horizontal plane) operation.

2. Description of the Related Art

In moving image capturing, a smooth panning operation is usually required with camera work. However, when performing image capturing using a hand-held camera or when performing manual panning using a tripod, it is difficult to move the hands at a predetermined speed, and it is very difficult to execute smooth panning close to a predetermined speed.

In recent years, correcting image blurs derived from camera shakes is an indispensable function of an image capturing apparatus, such as a video camera, when capturing a moving image. As for image stabilization related to a panning operation, there are many proposed techniques such as a method of correcting an image blur perpendicular to a panning direction (for example, Japanese Patent Laid-Open No. 2006-115322).

The image stabilization method according to the above conventional technique can correct an image blur perpendicular to a panning direction but cannot correct an image blur in the same direction as the panning direction (horizontal direction). It is therefore difficult to implement a smooth panning operation close to a predetermined speed for a user's panning operation.

SUMMARY OF THE INVENTION

The present invention has been made in consideration of the above-described problem, and implements a smooth panning operation close to a predetermined speed while performing image stabilization.

According to the first aspect of the present invention, there is provided an image capturing apparatus comprising: a shake detection unit configured to detect a shake of the image capturing apparatus; an image stabilization unit configured to correct the shake of an image to be captured; a panning detection unit configured to detect based on a detection result of the shake detection unit whether a panning operation is being executed; a speed setting unit configured to set a target speed of the panning operation; a calculation unit configured to calculate a correction amount of the image stabilization unit based on the target speed set by the speed setting unit and a speed of the shake detected by the shake detection unit; and a control unit configured to control a movement of the image stabilization unit based on the correction amount calculated by the calculation unit when the panning detection unit detects that the panning operation is being executed.

According to the second aspect of the present invention, there is provided a method of controlling an image capturing apparatus, comprising: a shake detection step of detecting a shake of the image capturing apparatus; an image stabilization step of correcting the shake of an image to be captured; a panning detection step of detecting based on a detection result of the shake detection step whether a panning operation is being executed; a speed setting step of setting a target speed of the panning operation; a calculation step of calculating a correction amount of the image stabilization step based on the target speed set in the speed setting step and a speed of the shake detected in the shake detection step; and a control step of controlling a movement of the image stabilization step based on the correction amount calculated in the calculation step when it is detected in the panning detection step that the panning operation is being executed.

Further features of the present invention will become apparent from the following description of exemplary embodiments with reference to the attached drawings.

DESCRIPTION OF THE EMBODIMENTS

The embodiments of the present invention will now be described in detail with reference to the accompanying drawings.

First Embodiment

Figure 1:
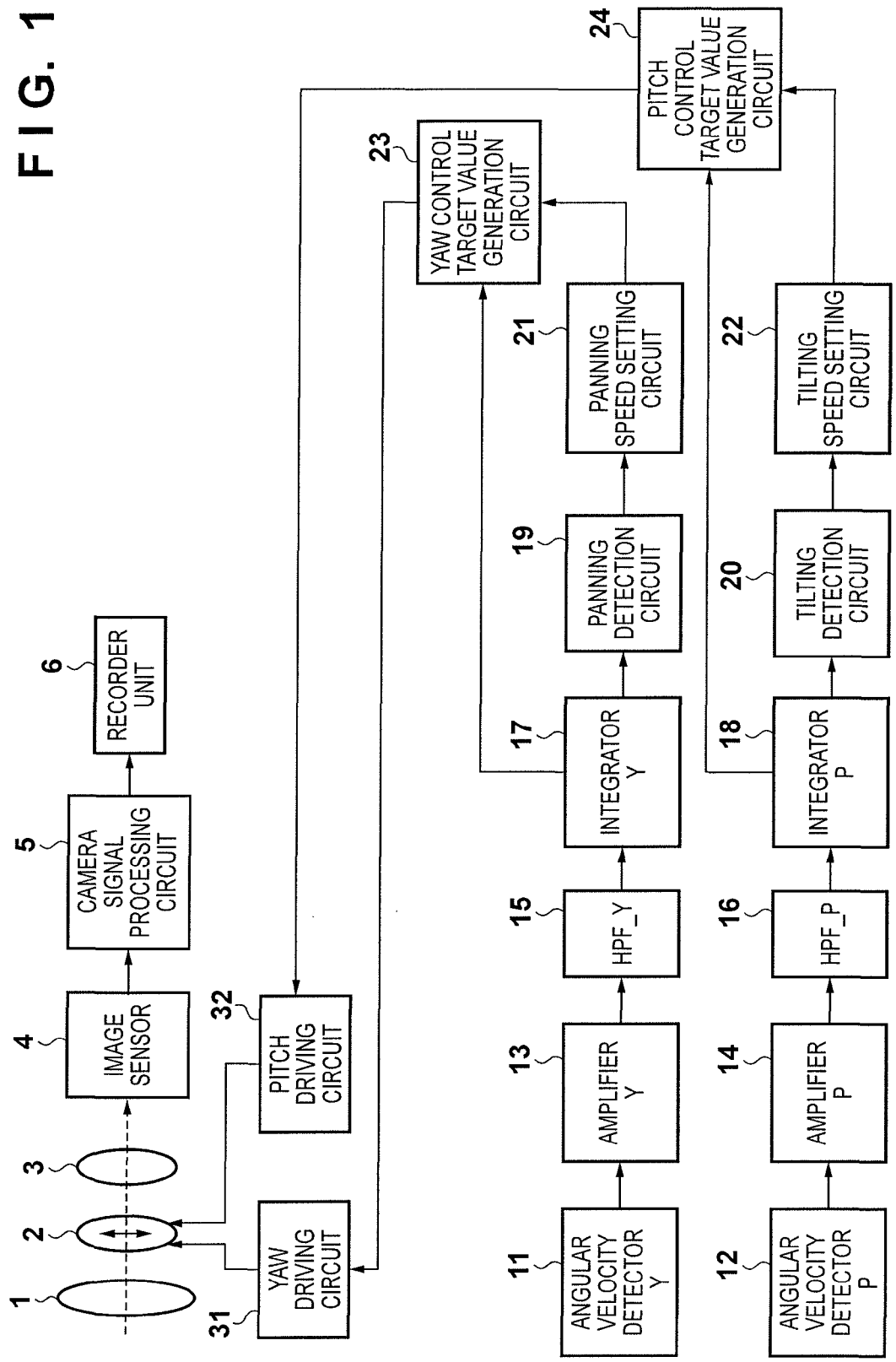
FIG. 1 is a block diagram showing the system arrangement of an image capturing apparatus according to the first embodiment of the present invention.

FIG. 1 is a block diagram showing the system arrangement of an image capturing apparatus according to the first embodiment of the present invention. Referring to FIG. 1, a magnification lens group 1 (zoom lens) changes the focal length and performs magnification. An image stabilization lens group 2 (shift lens) corrects an image blur (a shake of an image to be captured) by moving in a direction perpendicular to the optical axis. A focus adjustment lens group 3 (focus lens) has both a focus adjustment function and a so-called compensation function of correcting a movement of a focal plane caused by magnification. An image sensor 4 photoelectrically converts an object image formed via the lens groups 1, 2, and 3 and generates an image signal. As the image sensor 4, for example, a CCD, CMOS sensor, or the like is used. A camera signal processing circuit 5 includes an analog signal processing circuit and a digital signal processing circuit. The analog signal processing circuit of the camera signal processing circuit 5 generates an analog image capturing signal by performing predetermined processing for the signal obtained by the image sensor 4. The analog signal processing circuit includes, for example, a CDS (Correlated Double Sampling) circuit and an AGC (Automatic Gain Control) circuit. The digital signal processing circuit of the camera signal processing circuit 5 converts the analog image capturing signal into a digital signal by an A/D converter, and generates a digital video signal that has undergone predetermined signal processes such as gamma correction processing and white balance processing.

A recorder unit 6 includes a recording device for recording a video signal in a recording medium (for example, memory card, hard disk, DVD, or magnetic tape), a display device (for example, liquid crystal panel or viewfinder) for outputting and displaying the video signal, and control circuits thereof.

Angular velocity detectors 11 and 12 that are components of a shake detection mechanism are, for example, angular velocity sensors such as a vibration gyroscope. The angular velocity detectors 11 and 12 have different detection axes. In this embodiment, the angular velocity detector Y 11 detects a shake in the yaw direction, and the angular velocity detector P 12 detects a shake in the pitch direction. Amplifiers 13 and 14 amplify angular velocity signals representing shakes of the image capturing apparatus at the time of image capturing and output from the angular velocity detector Y (yaw direction) 11 and the angular velocity detector P (pitch direction) 12, respectively, and output the angular velocity signals. High-pass filters (HPFs) 15 and 16 have a function capable of changing the frequency characteristic by, for example, changing the cutoff frequency. The high-pass filters (HPFs) 15 and 16 cut off low frequency components included in the angular velocity signals amplified by the amplifier Y 13 and the amplifier P 14 and output the angular velocity signals. Integrators 17 and 18 integrate the angular velocity signals output from the high-pass filters (HPFs) 15 and 16, thereby obtaining angular displacement amounts.

A panning detection unit 19 serving as a moving detection unit determines panning as an angle-of-view moving operation of the image capturing apparatus in a predetermined direction based on the yaw direction angular displacement amount (the detection result of the angular velocity detector 11) output from the integrator Y 17. A tilting detection unit 20 determines tilting based on the pitch direction angular displacement amount output from the integrator 18. A panning speed setting unit 21 sets a panning speed in the yaw direction. The panning speed setting unit 21 also estimates and sets a panning target speed Vt based on the output result of the angular velocity detector 11. In addition, the panning speed setting unit 21 calculates a detected speed V from a time-rate change in the angular displacement amount. The panning speed setting unit 21 also calculates a correction speed Vc from the difference between the detected speed V and the panning target speed Vt. A tilting speed setting unit 22 sets a tilting speed in the pitch direction. The tilting speed setting unit 22 also estimates the tilting target speed Vt, calculates the detected speed V, and calculates the correction speed Vc, like the panning speed setting unit 21. A yaw control target value generation unit 23 calculates the correction target value of the shift lens 2 based on the angular displacement amount output from the integrator Y 17 and the panning target speed output from the panning speed setting unit 21. A pitch control target value generation unit 24 calculates the correction target value of the shift lens 2 based on the angular displacement amount output from the integrator P 18 and the tilting speed output from the tilting speed setting unit 22. Driving units 31 and 32 are driving circuits configured to drive the shift lens 2 based on the correction target values obtained from the control target value generation units 23 and 24. The timing of panning detection, target setting and calculation of detected speed described above might occur sequentially or simultaneously. The description provided is for illustrative purposes only.

An operation from shake detection to image stabilization will be described next. First, the angular velocity detector Y 11 and the angular velocity detector P 12 detect shakes of the camera. The control target value generation units 23 and 24 obtain image stabilization target values matching the detection directions of the angular velocity detector Y 11 and the angular velocity detector P 12 for the respective axes. The driving units 31 and 32 drive and control the shift lens 2 in the yaw and pitch directions, respectively, in accordance with the image stabilization target values. This enables optical image stabilization.

The detection axes of the angular velocity detector Y 11 and the angular velocity detector P 12 are arranged to be perpendicular to each other on a plane perpendicular to the optical axis of the lens groups 1, 2, and 3. This makes it possible to correct the rotational shake of the camera in the horizontal (yaw) direction and that in the vertical (pitch) direction.

The yaw control target value generation circuit 23 calculates the image stabilization amount in the yaw direction based on a shake signal from the angular velocity detector Y 11. The yaw driving circuit 31 drives the shift lens 2 in a correction axis direction that is the same as the detection axis direction of the angular velocity detector Y 11, thereby performing image stabilization in the yaw direction. Similarly, the pitch control target value generation circuit 24 calculates the image stabilization amount in the pitch direction based on a shake signal from the angular velocity detector P 12. The pitch driving circuit 32 drives the shift lens 2 in a correction axis direction that is the same as the detection axis direction of the angular velocity detector P 12, thereby performing image stabilization in the pitch direction.

A panning operation of moving the camera in the horizontal direction will be described next. Note that a tilting operation of moving the camera in the vertical direction can be processed in an equivalent way as in panning, by substituting the yaw and pitch axes. Hence, a panning operation will be described below, and a description of a tilting operation will be omitted.

Figure 2:
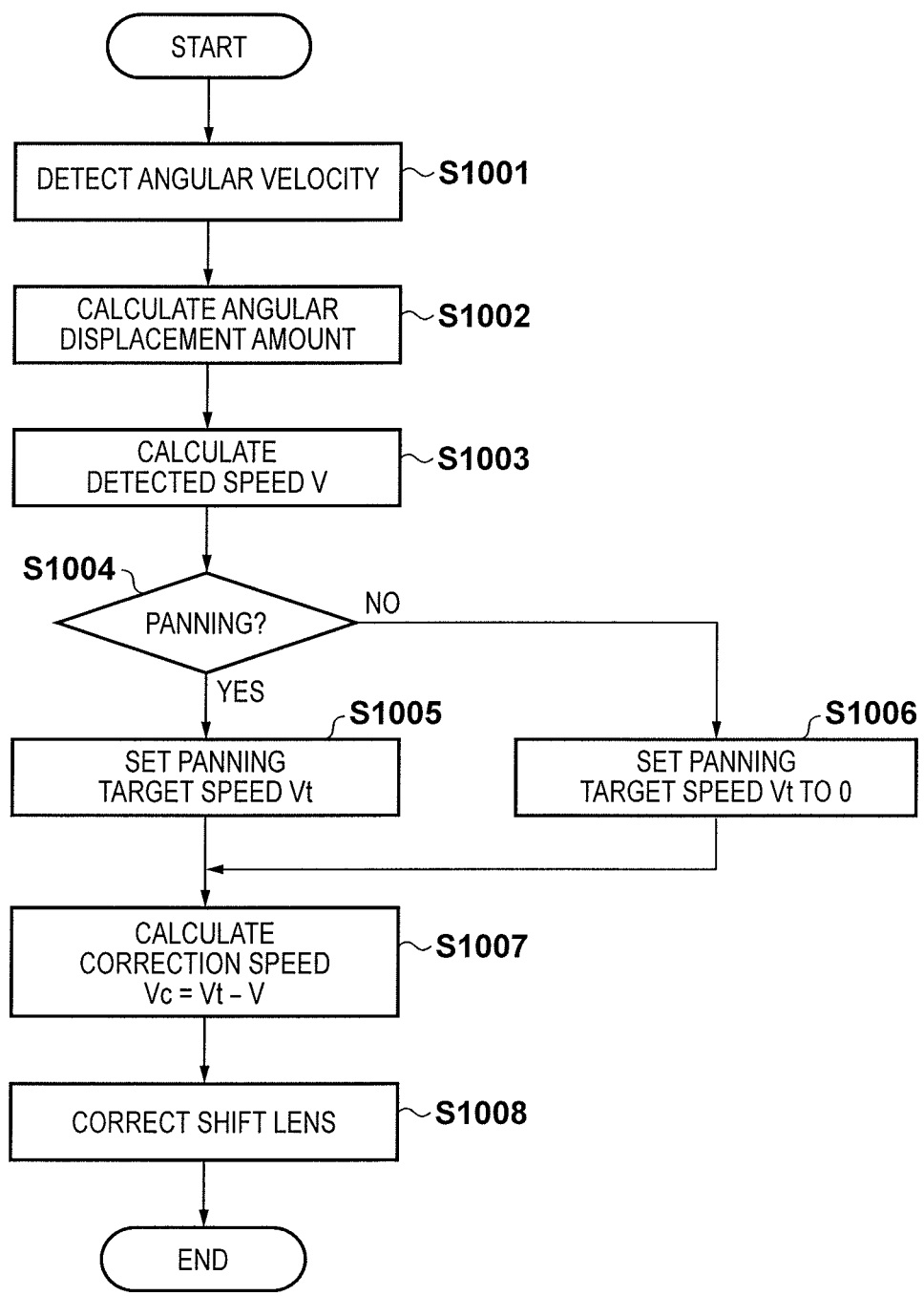
FIG. 2 is a flowchart showing control processing of a predetermined speed panning operation according to the first embodiment.

FIG. 2 is a flowchart showing processing for implementing a panning operation at a predetermined speed. This procedure is repeatedly executed at a predetermined period (for example, the detection period of the angular velocity sensor). The operation may be performed only when image stabilization is ON.

In step S1001, the angular velocity detector Y 11 detects the angular velocity of a shake. In step S1002, the integrator 17 integrates the angular velocities of the shake, thereby calculating the angular displacement amount. In step S1003, the panning speed setting unit 21 calculates the detected speed V from a time-rate change in the angular displacement amount. In step S1004, the panning detection unit 19 determines panning based on the angular displacement amount. In step S1004, the panning detection unit 19 discriminates whether the angular displacement amount changes in the same direction.

If the panning detection unit 19 determines in step S1004 that the panning operation of the apparatus is being performed, the process advances to step S1005. Upon judging that panning is not being performed, the process advances to step S1006. In step S1005, the panning speed setting unit 21 estimates and sets the panning target speed Vt based on the output result of the angular velocity detector Y 11. In step S1006, the panning target speed Vt is set to 0.

In step S1007, the panning speed setting unit 21 calculates the correction speed Vc from the difference between the detected speed V calculated in step S1003 and the panning target speed Vt set in step S1005 (or in step S1006). In step S1008, the yaw control target value generation unit 23 obtains a correction target position from the correction speed Vc calculated in step S1007 and the displacement/velocity value from Integrator Y 17, and corrects the shift lens.

Figure 3:
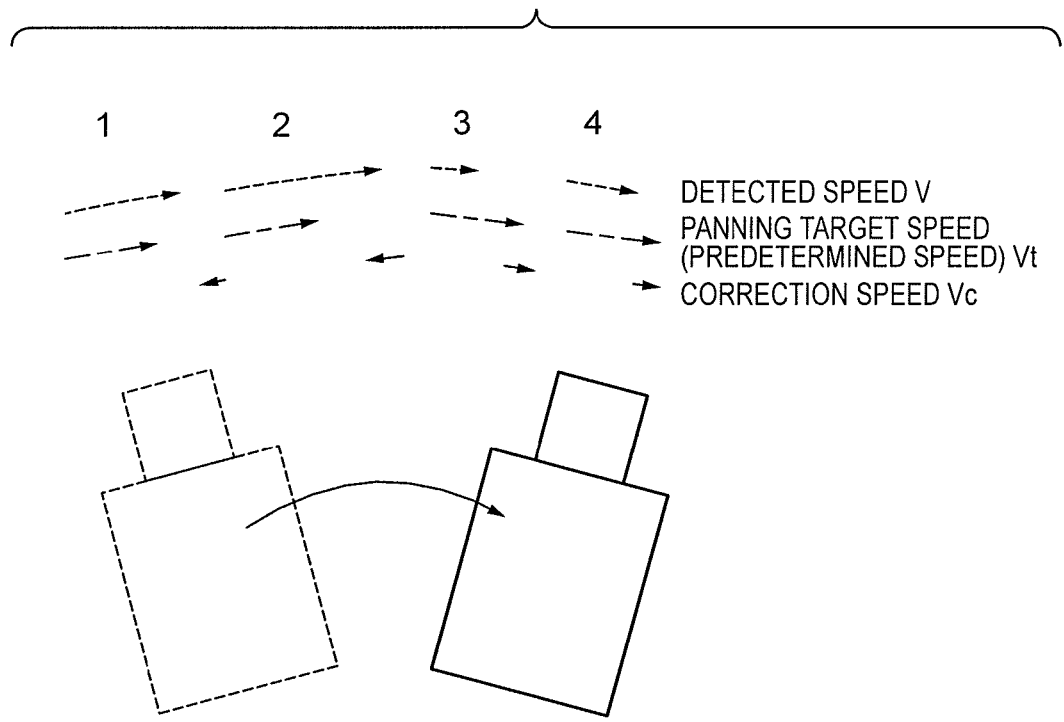
FIG. 3 is a conceptual view showing vectorized speed calculation in the predetermined speed panning operation according to the first embodiment.

FIG. 3 is a conceptual view showing a vectorized correction speed used to implement a panning operation at a predetermined speed. Vectors indicated by dotted lines represent the detected speed V. Vectors indicated by alternate long and short dashed lines represent the target speed Vt used to implement predetermined speed panning. Vectors indicated by solid lines represent the correction speed Vc. At this time, the correction speed Vc can be obtained by $$Vc = Vt - V \quad (1)$$

That is, the speed detected by the sensor is subtracted from the predetermined panning target speed, thereby obtaining the correction speed. When the detected speed V is lower than the target speed Vt, the shift lens 2 is driven in a direction in which the panning is further performed so as to speed up the movement of the shift lens 2. Conversely, when the detected speed V is higher than the target speed Vt, the shift lens 2 is driven in a direction in which the panning slows down so as to suppress the movement of the shift lens 2.

A method of estimating the panning target speed Vt in step S1005 will be described next. The panning target speed Vt is ideally the speed of an angle-of-view changing speed intended by the user. Hence, the speed is estimated by obtaining, for example, an average value during a predetermined time from the angular displacement amount based on the angular velocity detected by the angular velocity detector Y 11.

As the first method, to keep a predetermined panning speed, the average value of moving speeds for a predetermined time (for example, 0.5 sec) after the start of panning operation is calculated, and the calculated speed is set as the target speed Vt during the panning operation. The same speed is set as the target speed for the duration of the panning operation, and a panning operation at a predetermined speed can be performed.

As the second method, the average value is calculated for a predetermined time not only after the start of panning operation but also any time, and the target speed Vt is updated periodically (for example, every 0.5 sec). In this case, even when a speed change occurs in the user's panning operation, it is possible to always quickly follow the speed change and perform a smooth panning operation at a predetermined speed.

As the third method, the average value for a predetermined time is calculated any time, and a threshold for target speed update is provided. If a change in the calculated average value is equal to or larger than the threshold, the target speed Vt is updated. In the first method, a fixed target speed is set. In the second method, a periodically changeable target speed is set. In the third method, however, a fixed target speed is used unless a large change occurs in a speed estimation result obtained from the calculated average values. The target speed can be updated only when a large change occurs. In this way, even when a speed change occurs in the user's panning operation, the panning operation at a predetermined speed can basically be performed, and additionally, the operation can follow even a large change in the panning speed. Note that the predetermined time in which the average value is calculated can be a fixed time, or the time of average value calculation may be changed in accordance with the panning speed.

Image stabilization control at this time of panning will be described next. When panning is performed, the camera preferably moves at a predetermined speed in its moving direction. However, in a direction perpendicular to the direction in which the camera moves (camera moving direction) (for example, the pitch direction when the camera is moved in the yaw direction), an image blur is preferably suppressed. To do this, in a direction in which panning is detected (direction parallel to the camera moving direction), the correction amount is calculated in accordance with the panning target speed. However, in a direction perpendicular to the direction in which panning is detected, correction is controlled so as to correct all shakes detected without being determined as panning as much as possible.

As described above, the system described in this embodiment estimates the panning target speed based on an angular displacement amount detected at the time of panning (or tilting) operation, and performs correction by a correction speed obtained by subtracting the detected speed from the target speed so that the angle of view, and hence the scene viewed, moves at a predetermined speed. This makes it possible to implement a smooth panning operation close to a predetermined speed for a user's manual panning operation.

Second Embodiment

The second embodiment of the present invention will be described next. In the first embodiment, a method of correcting panning by estimating a panning target speed from the average value of detected angular displacement amounts has been described. In the second embodiment, an example will be explained in which the panning target speed is decided by another method.

Note that the following method can be implemented based on the system arrangement shown in FIG. 1 described in the first embodiment. A panning operation at a predetermined speed can also be implemented by an operation based on the procedure shown in FIG. 2 except the detailed panning target speed deciding method of step S1005 of FIG. 2.

As described in the first embodiment, the panning target speed is ideally the speed of an angle-of-view changing speed intended by the user. However, in image capturing using a hand-held camera or in a manual operation using a tripod, it is difficult for the user to attain an intended angle of view, and therefore, it is difficult to estimate the speed intended by the user. Considering the problem from another angle, it is believed that the angular displacement amount detected from an angular velocity sensor does not reflect the speed intended by the user in many cases.

On the other hand, when a scene in which a moving object is captured by following it with the camera it is assumed, the user should move the camera such that the followed object fits in the screen. Hence, a motion vector of an image may be calculated, and the target speed and the correction speed may be calculated such that an object detected in the image is located at the center of the screen.

Figure 4:
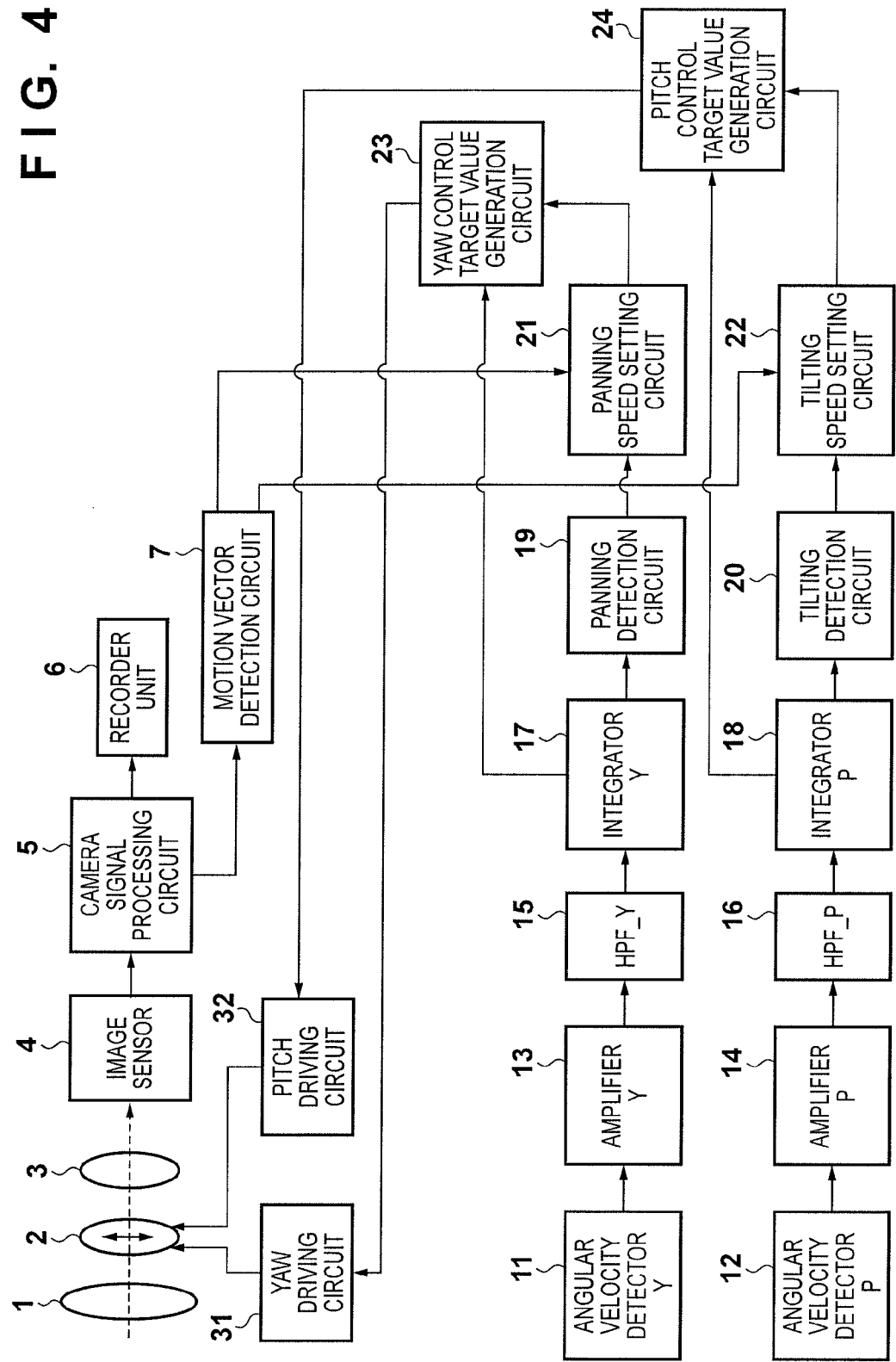
FIG. 4 is a block diagram showing the system arrangement of an image capturing apparatus according to the second embodiment.

FIG. 4 is a block diagram showing a system arrangement configured to implement the above-described processing in this embodiment. The system arrangement is similar to that shown in FIG. 1 except that the system includes a motion vector detection circuit 7. The motion vector detection circuit 7 detects a motion vector between frames based on a video signal output from a camera signal processing circuit 5. The detected motion vector is input to a panning speed setting circuit 21 and a tilting speed setting circuit 22. The speed setting circuits 21 and 22 decide the panning and tilting speed based on the input motion vector.

As described, the system of this embodiment calculates the panning (or tilting) target speed based on a motion vector detected in the panning (or tilting) operation. Then, the system performs correction by a correction speed obtained by subtracting the detected speed from the target speed so that the angle of view, and hence scene viewed, moves at a predetermined speed. This makes it possible to implement a smooth panning operation close to a predetermined speed for a user's manual panning operation.

Third Embodiment

The third embodiment of the present invention will be described next. In this embodiment, an example will be explained in which the panning target speed is decided by a method different from those described in the first and second embodiments.

Note that the following method can also be implemented based on the system arrangement shown in FIG. 1 described in the first embodiment. A panning operation at a predetermined speed can also be implemented by an operation based on the procedure shown in FIG. 2 except for the detailed panning target speed deciding method of step S1005 of FIG. 2.

A panning operation is an image capturing method in which the user intentionally abruptly moves a camera from a standstill state. Only the user knows the timing to move the camera. In addition, the panning speed is decided by the user's intention, and it is difficult to estimate it.

In this embodiment, a plurality of target speed initial values (for example, high-speed pan, medium-speed pan, low-speed pan, and ultralow-speed pan) are stored in advance. Immediately after panning detection, one of the initial values is set as the target speed (initial speed setting). After that, during progress of the panning operation, the initially set target speed can continuously be used as a fixed speed. Alternatively, the target speed may be estimated from the average value of angular displacement amounts according to the user operation and successively updated, as described in the first embodiment.

Figure 5:
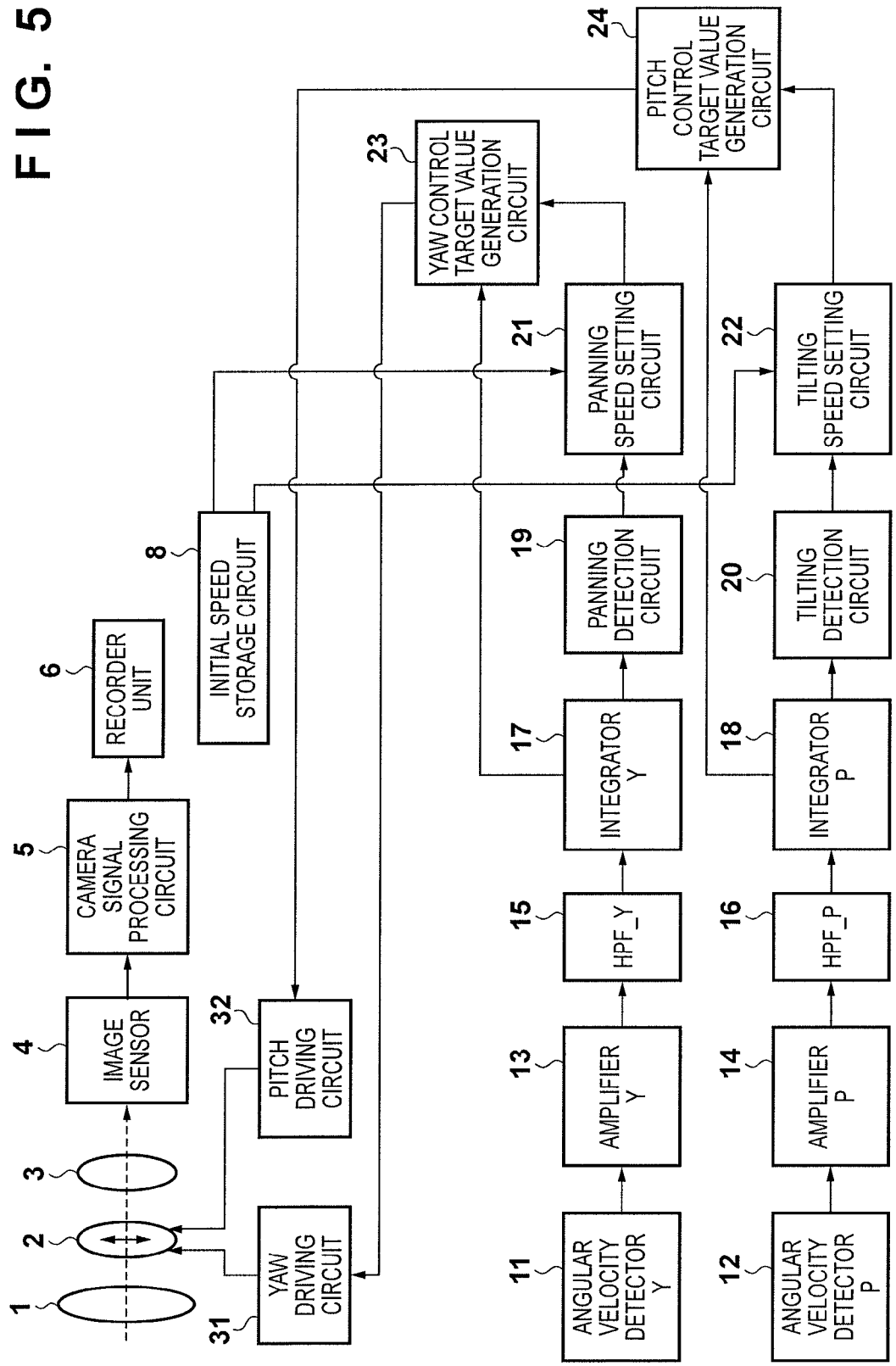
FIG. 5 is a block diagram showing the system arrangement of an image capturing apparatus according to the third embodiment.

FIG. 5 is a block diagram showing a system arrangement configured to implement the above-described processing in this embodiment. The system arrangement is similar to that shown in FIG. 1 except that the system includes an initial speed storage circuit 8. The initial speed storage circuit 8 stores the initial values of the panning target speed in advance. When a panning detection unit 19 or a tilting detection unit 20 detects a panning operation or a tilting operation, the initial values of the panning target speed and tilting target speed stored in the initial speed storage circuit 8 are read out. Then, a panning speed setting circuit 21 and a tilting speed setting circuit 22 decide the target speeds.

Alternatively, an image capturing rehearsal mode may be provided. The initial value of the panning target speed may be decided based on a panning operation in the rehearsal mode in advance and stored in the initial speed storage circuit 8. In this case, when image capturing is performed in an image capturing mode, and panning is detected, the initial speed stored in the rehearsal mode as an initial value is read out.

As described above, the system of this embodiment decides a target speed initial value stored in a panning (or tilting) operation as a panning (or tilting) target speed. Then, the system performs correction by a correction speed obtained by subtracting the detected speed from the target speed so that the screen moves at a predetermined speed. This makes it possible to implement a smooth panning operation close to a predetermined speed for a user's manual panning operation.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-093044, filed Apr. 25, 2013, which is hereby incorporated by reference herein in its entirety.

What is claimed is:

1. An image stabilization apparatus comprising:
    a shake detection unit configured to detect a shake;
    an image stabilization unit configured to correct the shake of an image to be captured;
    a panning detection unit configured to detect based on a detection result of said shake detection unit whether a panning operation is being executed;
    a speed setting unit configured to set a target speed of the panning operation;
    a calculation unit configured to calculate a correction amount of said image stabilization unit based on the target speed set by said speed setting unit and a speed of the shake detected by said shake detection unit;
    a control unit configured to control a movement of said image stabilization unit based on the correction amount calculated by said calculation unit when said panning detection unit detects that the panning operation is being executed; and
    a storage unit configured to store a plurality of initial speeds in advance,
    wherein the target speed of the panning operation is set to be equal to an arbitrary initial speed of the plurality of initial speeds stored in said storage unit by said speed setting unit immediately after said panning detection unit detects that the panning operation is being executed.

2. The apparatus according to claim 1, wherein said calculation unit calculates the correction amount of said image stabilization unit based on a difference between the target speed set by said speed setting unit and the speed of the shake detected by said shake detection unit, and
    when said panning detection unit detects that the panning operation is being executed, said control unit controls the movement of said image stabilization unit based on the correction amount calculated by said calculation unit such that the speed of the panning operation becomes a predetermined speed.

3. The apparatus according to claim 1, wherein said control unit controls the movement of said image stabilization unit based on a shake amount detected by said shake detection unit with respect to the shake of the image to be captured in a direction perpendicular to a moving direction of an angle of view in the panning operation.

4. The apparatus according to claim 1, wherein said shake detection unit comprises a gyroscope configured to detect an angular velocity of the shake of the image capturing apparatus, and said speed setting unit estimates the target speed of the panning operation based on an average value of a moving speed of an angle of view obtained based on the angular velocity detected by said shake detection unit.

5. The apparatus according to claim 1, wherein said shake detection unit comprises motion vector detection unit configured to detect a motion vector of an image from a captured image signal, and said speed setting unit calculates the target speed of the panning operation based on the motion vector detected by said motion vector detection unit.

6. The apparatus according to claim 1, further comprising initial speed setting unit configured to calculate the target speed of an angle-of-view moving operation based on a pre-operation and storing the target speed in storage unit as an initial speed, and said speed setting unit sets the initial speed stored in said storage unit by said initial speed setting unit as the target speed of the panning operation immediately after said panning detection unit detects that the panning operation is being executed.

7. The apparatus according to claim 1, further comprising display unit configured to display a difference between the target speed of the panning operation and the speed of the shake detected by said shake detection unit.

8. A method of controlling an image stabilization apparatus, comprising:
    detecting a shake;
    correcting the shake of an image to be captured;
    detecting based on a detection result of the detecting whether a panning operation is being executed;
    setting a target speed of the panning operation;
    calculating a correction amount in the correcting based on the target speed set in the setting and a speed of the shake detected in the detecting;
    controlling a movement in correcting based on the correction amount calculated in the calculating when it is detected in the detecting that the panning operation is being executed; and
    storing a plurality of initial speeds in advance,
    wherein the setting sets the target speed of the panning operation to be equal to an arbitrary initial speed of the plurality of initial speeds stored in the storing immediately after the detecting detects that the panning operation is being executed.

9. A non-transitory computer readable storage medium storing a program that causes a computer to execute a method of controlling an image stabilization apparatus, said method comprising:
    detecting a shake;
    correcting the shake of an image to be captured;
    detecting based on a detection result of the detecting whether a panning operation is being executed;
    setting a target speed of the panning operation;
    calculating a correction amount in the correcting based on the target speed set in the setting and a speed of the shake detected in the detection step detecting;
    controlling a movement in the correcting based on the correction amount calculated in the calculating when it is detected in the detecting that the panning operation is being executed; and
    storing a plurality of initial speeds in advance,
    wherein the setting sets the target speed of the panning operation to be equal to an arbitrary initial speed of the plurality of initial speeds stored in the storing immediately after the detecting detects that the panning operation is being executed.

* * * * *